United States Patent [19]

Lovato

[11] Patent Number: 4,699,747

[45] Date of Patent: Oct. 13, 1987

[54] METHOD OF MOLDING A PLASTIC BUCKLE WITH FLOATING CENTER BAR

[75] Inventor: Attilio Lovato, Via Mongino, Italy

[73] Assignee: ITW Fastex Italia S.p.A., Turin, Italy

[21] Appl. No.: 715,233

[22] Filed: Mar. 22, 1985

[30] Foreign Application Priority Data

Mar. 23, 1984 [IT] Italy .................... 67277 A/84

[51] Int. Cl.⁴ .................. B29C 45/13; B29C 45/16
[52] U.S. Cl. .................. 264/242; 264/328.8; 425/130
[58] Field of Search .......... 264/242, 328.1, 328.8; 425/573, 577, 130

[56] References Cited

U.S. PATENT DOCUMENTS

| 3,443,005 | 5/1969 | Braun | 264/242 |
| 4,114,849 | 9/1978 | von Holdt | 264/242 |
| 4,210,620 | 7/1980 | von Holdt | 264/242 |
| 4,377,872 | 3/1983 | Daniell, Jr. | 2/321 |
| 4,398,324 | 8/1983 | Bakker et al. | 24/230 R |
| 4,400,855 | 8/1983 | Stuart | 24/200 |
| 4,579,709 | 4/1986 | Ferreri | 264/242 |

FOREIGN PATENT DOCUMENTS 2125880  3/1984  United Kingdom .

*Primary Examiner*—James Lowe
*Attorney, Agent, or Firm*—John P. O'Brien; Thomas W. Buckman

[57] ABSTRACT

The method consists in simultaneously press-molding inside a single die a rectangular frame and a transverse movable cross-piece, which have a sliding relationship to each other to form a buckle with a sliding crossbar. Synthetic resins are simultaneously injected in different points into a die after having inserted in the die a sliding separation and coupling means to obtain the sliding coupling of the two piece of the buckle simultaneously with the molding of the same.

2 Claims, 10 Drawing Figures

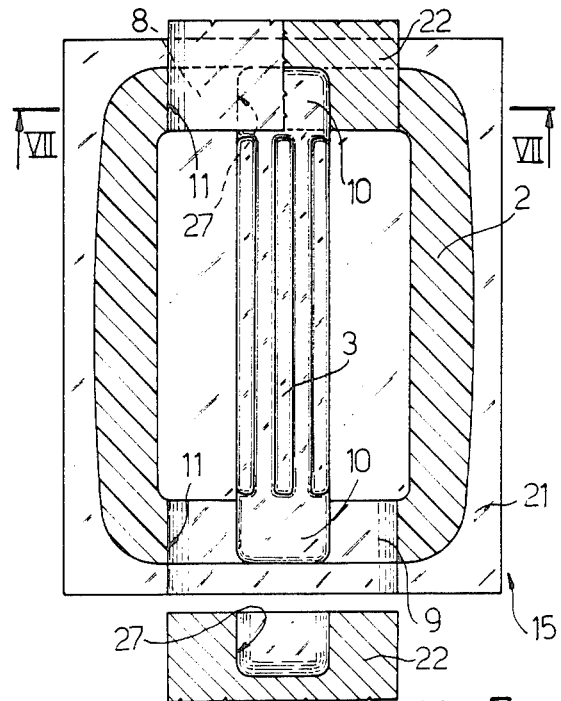
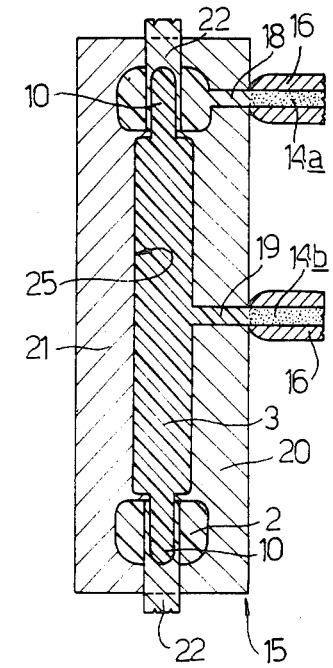
Fig. 5  Fig. 6
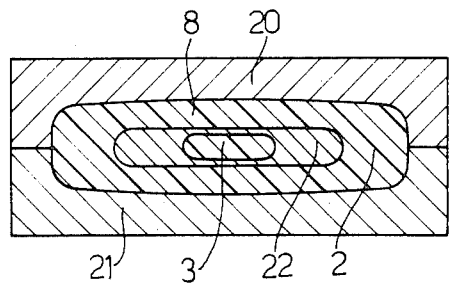
Fig. 7
Fig. 8
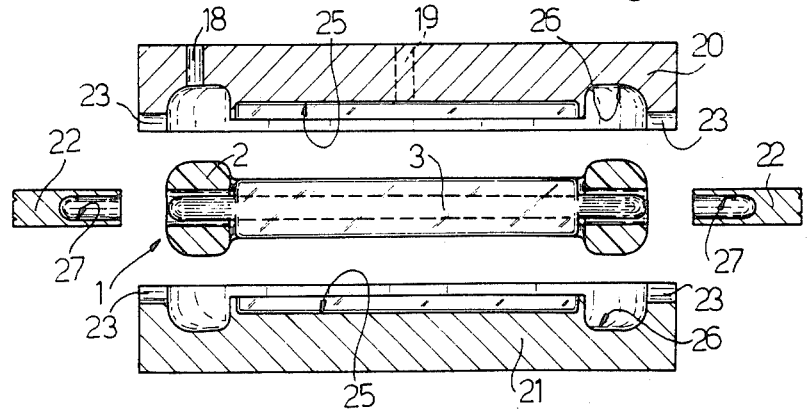

METHOD OF MOLDING A PLASTIC BUCKLE WITH FLOATING CENTER BAR

BACKGROUND OF THE INVENTION

The present invention relates to a process for manufacturing a perfected plastic buckle for belts and similar and a buckle produced using such a process. In particular, the buckle covered by the present invention comprises a frame structure in which slides at least one crossbar.

Buckles for belts or similar are already known whereby the strip material (belt, strap or similar) held in place by the buckle itself may be tightened or loosened by the user employing one hand. Such buckles usually comprise a four-sided frame with a crossbar sliding inside the same so as to define inside the same two adjustable apertures separated by the crossbar itself. One of the cross members on the frame, parallel with the sliding bar, is designed for permanent connection of a first end of the strip material to be held in place, whereas a portion of the second end of the said strip material may be held in place by the buckle, in releasable manner, by inserting it from underneath into the first of the said apertures adjacent to the said cross member on the frame, by passing it over the said sliding crossbar and out through the second said aperture where it is held tight between a second cross member on the frame, parallel with the first, and a main portion of the said second end of strip material, after being tightened flat with the buckle. Buckles of the aforementioned type are usually made of metal in two pieces bent and connected to each other, or of plastic comprising a first part fitted firmly with the said sliding crossbar and housed in guillotine manner in a seat formed inside the frame which is therefore hollow. Withdrawal of the guillotine part from the frame is prevented, after insertion, by securing on the latter the said first end of strip material to be held in place. Buckles of the aforementioned type involve a number of drawbacks. In particular, the metal types are subject to corrosion and rust rapidly during use, whereas the plastic types, in addition to being relatively large in size, involve high production cost, owing to their being formed in two parts produced separately and later fitted one inside the other. Furthermore, prior to securing the strip material, no means is provided for securing the part sliding inside the hollow frame, which may thus come out and be lost.

SUMMARY OF THE INVENTION

The aim of the present invention is to provide a process for producing a plastic buckle of the aforementioned type involving low cost and high output by dispensing with the need to produce the two component parts on the buckle (frame and sliding bar) separately. A further aim of the present invention is to provide a perfected type of plastic buckle for belts or similar, the said buckle providing for low cost, fast, straightforward production, simplicity and reliability equal or superior to that of metal buckles, easy assembly and troublefree use.

With these aims in view, the present invention relates to a process for manufacturing a plastic buckle comprising a frame structure in which slides at least one crossbar, characterised by the fact that the said process comprises a single molding operation in which the said crossbar and the said frame structure are molded simultaneously and directly one inside the other by injecting a plastic polymer into a mold.

The present invention also relates to a plastic buckle comprising a frame structure and a crossbar sliding inside the latter, characterised by the fact that it comprises respective opposite sliding guides for the said crossbar and shoulder means for engaging the said sliding crossbar in the said sliding guides, so as to prevent withdrawal of the said crossbar from the said frame structure.

BRIEF DESCRIPTION OF THE DRAWINGS

Two non-limiting arrangements of the present invention will now be described with reference to the attached drawings in which:

FIGS. 5 to 8 show the process according to the present invention;

DETAILED DESCRIPTION OF THE INVENTION

Figure 1:
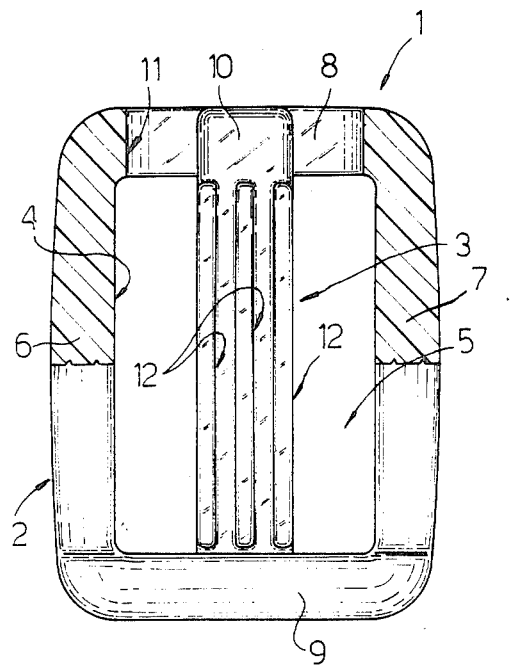
FIGS. 1 to 4 show plan view and elevations of a buckle according to the present invention.
Figure 2:
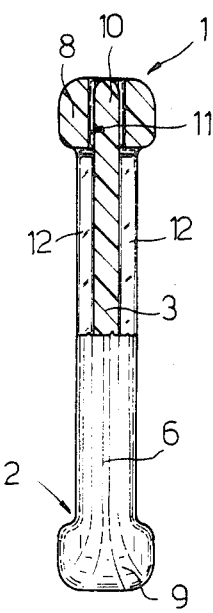
Figure 3:
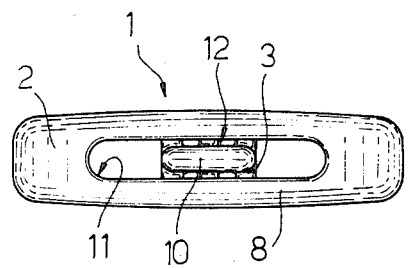
Figure 4:
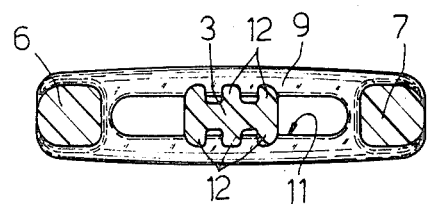

Number 1 in FIGS. 1 to 4 indicates a plastic buckle comprising a frame structure 2 in which slides at least one crossbar 3 in such a manner as to define, inside the said frame structure 2, two adjustable adjacent apertures, 4 and 5, enabling insertion inside buckle 1 of adjacent portions of one end of strip material, e.g. a belt, strap or similar, of any known type and omitted for simplicity, the said strip material being held in place by buckle 1. In more detail, frame structure 2 is essentially four-sided in shape and comprises two opposite end cross members, 6 and 7, and two opposite end side members 8 and 9, the latter being arranged essentially at right-angles to cross members 6 and 7 and formed integral with the same at their opposite ends. Crossbar 3, on the other hand, is mounted in sliding manner inside frame structure 2 so as to define with the latter the said adjustable apertures 4 and 5 by means of opposite ends 10 housed loosely inside respective longitudinal, essentially slot-shaped, sliding seats 11 formed through side members 8 and 9. According to the non-limiting example shown, ends 10 are essentially tab-shaped and thinner than crossbar 3 which is essentially as thick as or slightly thinner than side members 8 and 9 and corresponding cross members 6 and 7 on frame 2, and is provided, as far as opposite ends 10, with longitudinal ribs 12. Slot-shaped seats 11 form opposite sliding guides for crossbar 3 and are of such a length as to enable the latter to slide along side members 8 and 9 as far as opposite cross members 6 and 7 which act as a limit stop for preventing any further slide of crossbar 3. Any movement of crossbar 3 along its own axis is prevented by ribs 12 the opposite ends of which cooperate in sliding manner with side members 8 and 9 for preventing any possibility of crossbar 3 withdrawing from frame structure 2 through slot-shaped seats 11 through side members 8 and 9.

Clearly, therefore, the buckle according to the present invention essentially consists of a frame structure 2 engaged, in sliding and inseparable manner, with a crossbar 3 sliding crosswise along guides (seats 11) on the said frame structure 2. On such a buckle, the frame structure and sliding crossbar form a single unit and may be produced simply, quickly and cheaply employing the process according to the present invention which will now be described with reference to FIGS. 5 to 8. With reference to FIG. 6 in particular, the process according to the present invention for producing the aforementioned buckle 1 comprises a single molding operation, shown clearly in FIG. 6, in which crossbar 3 and frame structure 2 are molded simultaneously one inside the other by injecting a plastic polymer 14 into a mold 15. The said plastic material 14 is injected into mold 15 using a known technique (therefore not described, for simplicity), e.g. by means of nozzles 16 illustrated only schematically in FIG. 6, and mold 15 is held closed under pressure, in essentially fluidtight manner, by means, for example, of any known type of press not shown in the diagram for the sake of simplicity. According to the present invention, the said molding operation is performed by injecting simultaneously and separately into different points on mold 15 the liquid material for forming frame structure 2 and the liquid material for forming crossbar 3, and by inserting into mold 15 means for preventing contact between the said liquid materials forming crossbar 3 and frame structure 2 until the latter set. In more detail, the liquid material 14a for forming frame structure 2 is injected into mold 15 through channel 18, whereas the liquid material 14b for forming sliding crossbar 3 is injected into mold 15 through channel 19.

As clearly shown in FIG. 8, mold 15 comprises two opposite half-molds 20 and 21 arranged facing and designed to be fitted against each other, and is provided with sliding cores consisting of skids 22 designed to fit into compartments 23 on half-molds 20 and 21, when the latter are fitted against each other, so as to produce, during molding, seats or slots 11 in side members 8 and 9 on frame structure 2. In more detail, according to the present invention, half-molds 20 and 21 are provided with respective molding compartments 25, arranged facing so as to produce crossbar 3, and respective molding compartments 26, arranged facing and shaped essentially in the form of a rectangular, annular channel for producing frame structure 2, whereas skids 22 are provided with respective inner cavities 27 for defining molding compartments for tab ends 10 on crossbar 3, the said cavities 27 being positioned facing each other, when skids 22 are inserted into mold 15, and communicating with compartment 25 for molding crossbar 3. The said molding compartment 25 communicates directly with channel 19, whereas compartment 26, which is separated completely in fluidtight manner from compartment 25 when skids 22 are inserted inside compartments 23, communicates directly with channel 18.

Clearly, therefore, the molding operation for producing the said buckle 1 is performed as follows. Firstly, mold 15 is closed by bringing together half-molds 20 and 21, after which, skids 22 are inserted into mold 15 through compartments 23. In the preferred arrangement of the process according to the present invention and shown in FIGS. 5 to 8, the said skids 22 are two in number and inserted end to end into mold 15 coaxial with compartment 25 for molding crossbar 3. Injection nozzles are then fitted on channels 18 and 19 and the liquid polymer 14 is injected into mold 15 at appropriate pressure. In more detail, material 14a fills all of compartment 26 except for the part occupied by skids 22 which are inserted into mold 15 far enough to mate with compartment 25. Material 14b, on the other hand, fills all of compartment 25 and the corresponding compartments 27 on skids 22 facing and communicating with it. As clearly shown in FIGS. 5, 6 and 7, in like manner, both crossbar 3 and frame structure 2 are formed simultaneously while at the same time preventing liquid materials 14a and 14b from contacting each other and so joining crossbar 3 to side members 8 and 9. Finally, as soon as the injected material sets, skids 22 are removed, mold 15 is opened and the finished buckle 1 removed, the latter having crossbar 3 engaged in sliding manner inside frame structure 2. During the molding operation, the provision of skids 22 inside compartment 26 results in the formation on side members 8 and 9 of slot-shaped through seats 11, whereas subsequent withdrawal of skids 22 frees ends 10 on crossbar 3 so as to engage the said ends 10 in sliding manner inside seats 11 freed by skids 22. As shown clearly in FIG. 7, compartments 27 formed inside skids 22 provide for forming tabs or ends 10 straight on to side members 8 and 9, while at the same time providing for physical separation thanks to the walls on skid 22 being located between crossbar 3 and frame structure 2 inside mold 15.

Figure 9:
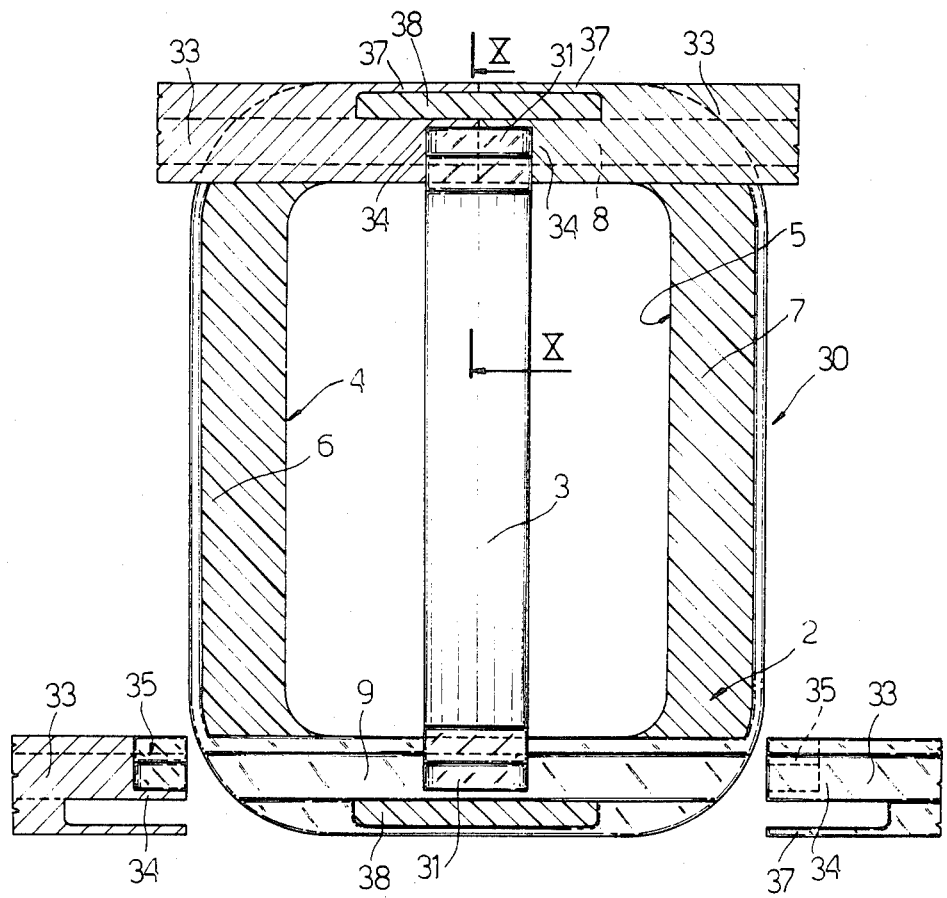
FIG. 9 shows a variation of the process according to the present invention.
Figure 10:
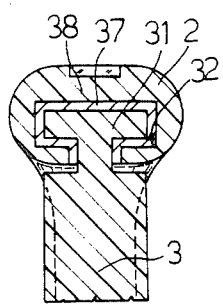
FIG. 10 shows a section along line X—X of the buckle produced by the FIG. 9 variation of the process according to the present invention.

FIGS. 9 and 10 show a possible variation 30 of the aforementioned buckle 1 and a corresponding variation of the aforementioned process for producing the said buckle 30. For the sake of simplicity, parts similar or identical to those already described are shown using the same numbers. With reference to FIGS. 9 and 10, buckle 30 is identical to buckle 1, except for the shape of sliding crossbar 3, the shape of the respective opposite connecting ends and the shape of the corresponding sliding seats for the ends of crossbar 3. In more detail, crossbar 3 on buckle 30 is cylindrical with essentially T-shaped opposite ends 31 (FIG. 10). Consequently, side members 8 and 9 on four-sided frame structure 2 are also provided with respective T-shaped sliding and guide seats 32 for ends 31, the said seats 32 being formed crosswise in relation to cross members 6 and 7 and along the entire inside length of side members 8 and 9. Buckle 30 is produced by simultaneously molding crossbar 3 and frame structure 2 inside a single mold in exactly the same way as described for buckle 1. The only variation as compared with the foregoing process and as shown clearly in FIG. 9 consists in employing, not two skids 22 inserted end to end into mold 15, but four skids 33 inserted laterally inside a mold identical to mold 15, and therefore not shown for simplicity, and crosswise in relation to compartment 25 for molding crossbar 3. In more detail, each skid 33 is provided on end 34 with an essentially T-shaped compartment 35, defining a portion of the compartment for molding end 31, and a tab 37 designed to form, on each seat 32, a corresponding rib 38 joining the opposite faces of buckle 30. Skids 33 are positioned facing in twos so as to engage end to end on the compartment for molding crossbar 3, and so as to join facing compartments 35 and corresponding tabs 37 on each pair of skids 33. During the molding operation, after closing the mold and inserting skids 33 into the same as described above, the liquid material for forming crossbar 3 fills the compartment for molding the latter, as well as filling the corresponding facing compartments 35 on each pair of skids 33. This is made possible in that the said skids 33 are positioned facing and communicating with the compartment for molding crossbar 3, so that T-shaped ends 31 on crossbar 3 are formed integral with the same. At the same time, the material for forming frame structure 2 fills the corresponding compartment inside the mold, except for the part of the said compartment engaged by skids 33. As clearly shown in FIG. 9, withdrawal of the said skids 33 results in the formation of seats 32 which, unlike seats 11 on buckle 1, instead of being formed through side members 8 and 9 crosswise with the same, are formed longitudinally through the entire length of the same. Clearly, therefore, this produces a buckle on which crossbar 3 slides inside frame structure 2 between cross members 4 and 5, and on which crossbar 3 cannot be removed from frame 2 in that it forms a single unit with the same by contacting cross members 6 and 7 and having any axial movement prevented by T ends 31 engaged in sliding manner in corresponding T seats 32.

The advantages of the buckle according to the present invention and, particularly, of the process enabling it to be produced rapidly and cheaply will be clear from the foregoing description. To those skilled in the art it will be clear that changes can be made to the invention described herein without, however, departing from the scope of the same.

I claim:

1. Method of molding a plastic buckle in a two-plate mold comprising the steps of:

closing two half-molds having identical shaped cavities together to form a rectangular loop-shaped compartment along the parting line of said mold and to form a longitudinal extending crossbar compartment through the middle of said rectangular loop-shaped compartment along the parting line of said mold, providing an elongate compartment into opposite sides of said closed two-half molds in communication with the opposite ends of said longitudinally extending crossbar compartment, said elongate compartments extending substantially across the two width portions of said rectangular loop-shaped compartment and extending outwardly through said mold, providing two pairs of mating slider parts, the outside surfaces of each pair conforming to the inside surfaces of said elongate compartment to permit nesting therein, each of said mating slider parts having an end cavity which mates with its mating part to define a recess of the same general cross sectional dimensions as said crossbar compartment at its outer end, inserting each pair of said mating slider parts into the opposite ends of the two elongate compartments in a direction perpendicular to said crossbar compartment, said end cavity of each pair of mating slider parts being in direct alignment with said crossbar compartment, and injecting a plastic polymer simultaneously and separately into said rectangular loop-shaped compartment and said crossbar compartment whereby said crossbar compartment forms a crossbar member whose ends are retained within said end cavity to prevent removal in its longitudinal direction while permitting said crossbar member to slide in a transverse direction within said end cavity.

2. Method of molding a plastic buckle in a two-plate mold comprising the steps of:

closing two half-molds having identical shaped cavities together to form a rectangular loop-shaped compartment along the parting line of said mold and to form a longitudinal extending crossbar compartment through the middle of said rectangular loop-shaped compartment along the parting line of said mold, providing an elongate compartment into opposite sides of said closed two-half molds which extends across the two end portions of said rectangular loop-shaped compartment and extends outwardly through said mold to form a straight through passageway through said mold in direct alignment with said two end portions of said rectangular loop-shaped compartment, providing two pairs of mating slider parts, the outside surfaces of each pair conforming to the inside surface dimensions of said through passageway to permit nesting therein, each slider part having a length at least as long as one-half the length of said through passageway, each pair of slider parts having an end cavity formed in its inner end in a mating relationship with each other, the end cavity of each pair of slider parts having a T-shaped cross section, each of said pair of slider parts having mating tab compartments formed inwardly of said inner end of said sliding parts, inserting each pair of said mating slider parts into the opposite ends of said through passageways in a direction perpendicular to said crossbar compartment to provide two pairs of slider parts in abutting relation, the end cavity of each pair of slider parts being in direct alignment with said crossbar compartment and said mating tab compartments being disposed parallel to and outwardly of said T-shaped end cavity, and injecting a plastic polymer simultaneously and separately into said rectangular loop-shaped compartment and said crossbar compartment whereby said crossbar compartment forms a crossbar member whose T-shaped ends are retained within said end cavity to prevent removal in its longitudinal direction while permitting said crossbar member to slide in a transverse direction within said end cavity.

* * * * *